(12) United States Patent
Mawatari

(10) Patent No.: US 6,962,286 B2
(45) Date of Patent: Nov. 8, 2005

(54) IC CARD AND IC CARD OPERATION METHOD

(75) Inventor: Eiji Mawatari, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/432,701

(22) PCT Filed: Jul. 17, 2002

(86) PCT No.: PCT/JP02/07254

§ 371 (c)(1),
(2), (4) Date: May 21, 2004

(87) PCT Pub. No.: WO03/030048

PCT Pub. Date: Apr. 10, 2003

(65) Prior Publication Data

US 2004/0195312 A1 Oct. 7, 2004

(30) Foreign Application Priority Data

Sep. 28, 2001 (JP) ........................................ 2001-302339

(51) Int. Cl.⁷ .................................................. G06K 5/00
(52) U.S. Cl. ........................................ 235/380; 705/14
(58) Field of Search ................................ 235/380, 375, 235/379, 381–384, 485–487; 705/14, 41, 402

(56) References Cited

U.S. PATENT DOCUMENTS

| | | | |
|---|---|---|---|
| 5,264,689 A | | 11/1993 | Maes et al. |
| 5,992,738 A | * | 11/1999 | Matsumoto et al. ........ 235/381 |
| 6,000,608 A | * | 12/1999 | Dorf .......................... 235/380 |
| 6,061,660 A | * | 5/2000 | Eggleston et al. ............ 705/14 |
| 6,129,274 A | * | 10/2000 | Suzuki ....................... 235/381 |
| 6,142,371 A | * | 11/2000 | Oneda ........................ 235/380 |
| 6,484,946 B2 | * | 11/2002 | Matsumoto et al. ........ 235/492 |
| 6,494,369 B1 | * | 12/2002 | Kikuchi ...................... 235/384 |
| 6,659,345 B2 | * | 12/2003 | Sukeda et al. .............. 235/382 |
| 6,834,802 B2 | * | 12/2004 | Sukeda et al. .............. 235/451 |
| 2003/0050837 A1 | * | 3/2003 | Kim ............................ 705/14 |

FOREIGN PATENT DOCUMENTS

| | | |
|---|---|---|
| EP | 0 950 970 | 10/1999 |
| EP | 0 992 950 | 4/2000 |
| JP | 4-70993 | 3/1992 |
| JP | 7-296253 | 11/1995 |
| JP | 9-231335 | 9/1997 |
| JP | 10-143572 | 5/1998 |
| JP | 10-172033 | 6/1998 |
| JP | 11-250353 | 9/1999 |
| WO | WO 95/02871 | 1/1995 |
| WO | WO 99 50803 | 10/1999 |

OTHER PUBLICATIONS

Patent Abstract of Japan, publication No. 11–165637 dated Jun. 22, 1999.

(Continued)

Primary Examiner—Thien M. Le
Assistant Examiner—Edwyn Labaze
(74) Attorney, Agent, or Firm—Frommer Lawrence & Haug LLP; William S. Frommer; Thomas F. Presson

(57) ABSTRACT

An IC card operation system is disclosed which enhances the added values of data stored on IC cards to promote acceptance of the cards. The storage area of each IC card is divided into a private and a public area. The private area accommodates a transport fare value while the public area stores reward points issued by shops. The shop-issued reward points are convertible to a transport fare value. The public area is further divided into a shop-specific point area and a common point area, the shop-specific point area accumulating points shop by shop, the common point area retaining points common to all shops. Each shop accumulates points to both of the shop-specific and common point area. Points are deducted from the common point area for use as a transport fare value. That is, only the points accumulated in the common point area of the IC card are used as transport fares while the points accumulated by individual shops are kept unchanged.

16 Claims, 10 Drawing Sheets

OTHER PUBLICATIONS

Patent Abstract of Japan, publication No. 04–070992 dated Mar. 5, 1992.

Patent Abstract of Japan, publication No. 05–324998 dated Dec. 10, 1993.

Patent Abstract of Japan, publication No. 11–250353 dated Seo, 17, 1999.

Patent Abstract of Japan, publication No. 2000–029965 dated Jan. 28, 2000.

* cited by examiner

FIG. 5

20 POINTS ISSUED FOR PURCHASES WORTH ¥2,000

(FARE DISCOUNT POINTS)

| ID | NO. OF POINTS |
|---|---|
| 2A | 3223.04 |
| 2B | 2.75 |
| 2C | 798.38 |
| 2D | 12.38 |
| 4F | 4024.17 |

(PUBLIC AREA)

36~

2A~2D: POINT ISSUERS
4F: SUM OF POINTS

POINT ISSUING/RECHARGING APPARATUS ~21

+20
+20

AFTER ADDITION (FARE DISCOUNT POINTS)

| ID | NO. OF POINTS |
|---|---|
| 2A | 3243.04 |
| 2B | 2.75 |
| 2C | 798.38 |
| 2D | 12.38 |
| 4F | 4044.17 |

(PUBLIC AREA)

36~

2A~2D: POINT ISSUERS
4F: SUM OF POINTS

FIG. 6

100 POINTS DEDUCTED FOR A FARE OF ¥100

(FARE DISCOUNT POINTS)

| ID | NO. OF POINTS |
|---|---|
| 2A | 3243.04 |
| 2B | 2.75 |
| 2C | 798.38 |
| 2D | 12.38 |
| 4F | 3944.17 |

(PUBLIC AREA)

2A~2D: POINT ISSUERS
4F: SUM OF POINTS

IC CARD TERMINAL, FARE BOX — 15, 16

−100

AFTER DEDUCTION

36

(FARE DISCOUNT POINTS)

| ID | NO. OF POINTS |
|---|---|
| 2A | 3243.04 |
| 2B | 2.75 |
| 2C | 798.38 |
| 2D | 12.38 |
| 4F | 4044.17 |

(PUBLIC AREA)

2A~2D: POINT ISSUERS
4F: SUM OF POINTS

| (TRANSPORT FARE VALUES) | | (TELEPHONE CHARGE VALUES) | | (FARE DISCOUNT POINTS) | |
|---|---|---|---|---|---|
| ID | TRANSPORT FARE VALUES | ID | TELEPHONE CHARGE VALUES | ID | NO. OF POINTS |
| 00 | ¥5000 | 00 | ¥1000 | 2A | 3243.04 |
| 01 | ¥1300 | 01 | ¥200 | 2B | 2.75 |
| 02 | ¥430 | 02 | ¥0 | 2C | 798.38 |
| 03 | ¥560 | 03 | ¥0 | 4E | 12.38 |
| 1F | ¥7290 | 1F | ¥1200 | 4F | 4044.17 |

(PRIVATE AREA) — 51, 52 ; (PUBLIC AREA) — 53

IC CARD AND IC CARD OPERATION METHOD

TECHNICAL FIELD

The present invention relates to an IC card, an IC card operation system, a point issuing apparatus, an adjusting apparatus, a center apparatus, and a billing apparatus. More particularly, the invention relates to an IC card, an IC card operation system, a point issuing apparatus, an adjusting apparatus, a center apparatus, and a billing apparatus whereby reward points are issued for purchases made at specific shops so that the accumulated points may be converted to an amount payable for transportation fares.

BACKGROUND ART

Recent years have seen widespread acceptance of IC cards with storage areas for accommodating diverse kinds of information written to and read from the suitable areas. One application of such IC cards, taking advantage of their capability for data storage and retrieval, involves recording transport fare values (a sort of electronic money) to the cards for use by passengers in adjusting bus fares.

The scheme works as follows: the platform of each bus is equipped with a fare box device for writing and reading data to and from IC cards. When a passenger of the bus holds up his or her IC card to the fare box device, the device reads a fare value from the card in non-contact fashion and adjusts the passenger's fare by deducting it from the retrieved value of the IC card and updating the remaining fare value.

When recharging the fare value on the IC card, each user pays an increased amount to the bus company or like business operator to have the IC card recharged with a fare value corresponding to the paid amount.

Every time a passenger gets on and off the vehicle, the fare box device acquires the passenger's ride history data by writing and reading such data as the bus stop and the time at which the passenger got on, the bus stop and the time at which the passenger got off, etc., to and from the card.

When passengers have their fares adjusted using IC cards, the receiving and releasing of passengers to and from the vehicle becomes more efficient than before. At the same time, the bus company can acquire the ride history data from the passengers' IC cards and statistically process the obtained data for subsequent use in bus operations.

In order to adjust passengers' fares using IC cards, the bus company must introduce an IC card system as an obvious precondition.

The IC card system, generally expensive, comprises: a fare box device furnished on board each bus; a recharging apparatus set up at each business office (a machine for recharging fare values on IC cards); and a data processing apparatus that connects these apparatuses online or offline for data processing purposes.

If the recharging apparatuses are run only by the bus company, the cost for installing and maintaining the apparatuses can be perceived as particularly high from the company's viewpoint. With only a limited number of locations available for setting up a small number of recharging apparatuses, the passengers who decide to use the IC cards can be inconvenienced considerably.

It is therefore an object of the present invention to overcome the above and other deficiencies of the prior art and to provide an IC card operation system and related equipment for facilitating the introduction of an IC card system.

DISCLOSURE OF INVENTION

In achieving the foregoing and other objects of the present invention and according to (1) thereof, there is provided an IC card comprising: an issuer-specific point area for storing cumulative amounts of points issued by point issuers, the issued points being accumulated in a manner specifying each of the cumulative points for the corresponding point issuer; a common point area for storing a cumulative amount of the points issued by the point issuers, the issued points being accumulated in a manner mingling all point issuers; and a payable amount area for storing a payable amount that may be paid so as to acquire either a product or a service offered by a specific business operator.

According to (2) of the invention, there is provided an IC card operation system utilizing an IC card as defined in (1) above, the system comprising: a point issuing apparatus for issuing points to be stored into at least one of the issuer-specific point area and the common point area; an adjusting apparatus for allowing the business operator to adjust an amount to be paid using at least either the points accumulated in the common point area or the payable amount stored in the payable amount area, wherein the cumulative amount of the points in the common point area is convertible into the payable amount at a predetermined rate; and a center apparatus for acquiring the number of points issued by the point issuing apparatus for storage into the common point area, the center apparatus further calculating the amount of points to be adjusted by the point issuers in payment for the business operator by use of the acquired number of issued points.

According to (3) of the invention, there is provided an IC card operation program executed by a computer used by an IC card operation system utilizing an IC card as defined in (1) above, the IC card operation program causing the computer to carry out the steps of: issuing points to be stored into at least one of the issuer-specific point area and the common point area in accordance with intentions of the point issuers; allowing the business operator to adjust an amount to be paid using at least either the points accumulated in the common point area or the payable amount stored in the payable amount area, wherein the cumulative amount of the points in the common point area is convertible into the payable amount at a predetermined rate; and acquiring the number of points issued in the point issuing step for storage into the common point area, so as to calculate the amount of points to be adjusted by the point issuers in payment for the business operator by use of the acquired number of issued points.

According to (4) of the invention, there is provided an IC card operation system as defined in (2) above, wherein the point issuing apparatus further comprises a recharging function for recharging the payable amount in the payable amount area; and wherein the center apparatus acquires from the point issuing apparatus the payable amount recharged by the point issuing apparatus, the center apparatus further calculating the recharged payable amount adjusted to be paid by the point issuers to the business operator by use of the acquired payable amount.

According to (5) of the invention, there is provided an IC card operation program as defined in (3) above, wherein the point issuing step further causes the computer to carry out the step of recharging the payable amount in the payable amount area; and wherein the adjusted point amount calculating step further comprises acquiring the payable amount recharged in the point issuing step, so as to calculate the recharged payable amount adjusted to be paid by the point issuers to the business operator by use of the acquired payable amount.

According to (6) of the invention, there is provided an IC card operation system as defined in (4) above, wherein, upon calculating the recharged payable amount adjusted to be paid by the point issuers to the business operator, the center apparatus deducts fees to be provided to the point issuers from the amount recharged by the point issuers.

According to (7) of the invention, there is provided an IC card operation program as defined in (5) above, further causing the computer to carry out the step of deducting fees to be provided to the point issuers from the amount recharged by the point issuers when, in the adjusted point amount calculating step, said computer calculates the recharged payable amount adjusted to be paid by the point issuers to the business operator.

According to (8) of the invention, there is provided an IC card as defined in (1) above, wherein at least one of the issuer-specific point area and the common point area is capable of storing micro-points each denoting a value less than one.

According to (9) of the invention, there is provided an IC card as defined in (1) above, wherein data are written to and read from the issuer-specific point area, the common point area, and the payable amount area in non-contact fashion.

According to (10) of the invention., there is provided a point issuing apparatus for use by an IC card operation system as defined in (2) above, the apparatus comprising: a point issuing element for issuing points to be stored into at least one of the issuer-specific point area and the common point area; an issued point count providing element for providing the center apparatus with the number of points issued for storage into the common point area; and an accumulated point presenting element for acquiring and presenting the cumulative amount of points issued by a specific point issuer upon retrieval from the issuer-specific point area.

According to (11) of the invention, there is provided a point issuing apparatus as defined in (10) above, further comprising: a recharging element for recharging the payable amount in the payable amount area; and a recharged amount providing element for providing the center apparatus with the recharged payable amount.

According to (12) of the invention, there is provided an adjusting apparatus for use by an IC card operation system as defined in (2) above, the apparatus comprising: a payment amount acquiring element for acquiring an amount to be paid; and a converting element for converting the points accumulated in the common point area into the payable amount at a predetermined rate; wherein the converting element acquires the points corresponding to the acquired amount to be paid and deducts the acquired points from the common point area; and wherein, if the payable amount acquired by the converting element falls short of the acquired amount to be paid, then the shortfall is deducted from the payable amount area in order to adjust the amount to be paid.

According to (13) of the invention, there is provided a center apparatus as defined in (2) above, further comprising a presenting element for calculating a billed amount to be paid by the point issuers to the business operator by use of the number of points issued by the point issuing apparatus and the recharged payable amount, the presenting element further presenting the calculated billed amount to the point issuers.

According to (14) of the invention, there is provided a center apparatus as defined in (13) above, wherein fees to be provided to the point issuers upon addition of points by the point issuing apparatus are deducted from the billed amount calculated.

According to (15) of the invention, there is provided a center apparatus as defined in (13) above, wherein the adjusting apparatus further comprises a history accessing element which, upon gaining access to a storage area of the IC card when said IC card is used for payment, either writes to or reads from the storage area a history of any products and services purchased from the business operator; and wherein the center apparatus further comprises a data mining result providing element for providing the business operator with information resulting from data mining of the history acquired by the history accessing element.

According to (16) of the invention, there is provided a billing apparatus comprising a recharged amount acquiring element for acquiring from an IC card an amount recharged by a recharging apparatus as an addition to a payable amount stored on the IC card, the payable amount being used to acquire either a product or a service; wherein a business operator having installed the recharging apparatus is billed for the recharged amount acquired minus fees to be provided to the business operator.

BRIEF DESCRIPTION OF DRAWINGS

FIG. 5 is a schematic view explaining how a point issuing apparatus of the invention writes transport fare discount points to the IC card;

FIG. 6 is a schematic view showing how a transport fare for a bus or a train run by a transport business operator is adjusted using transport fare discount points retrieved from the IC card;

FIG. 10 is a schematic view showing another storage area structure on the IC card of the invention.

BEST MODE FOR CARRYING OUT THE INVENTION

[Outline of the Embodiments]

Figure 1:
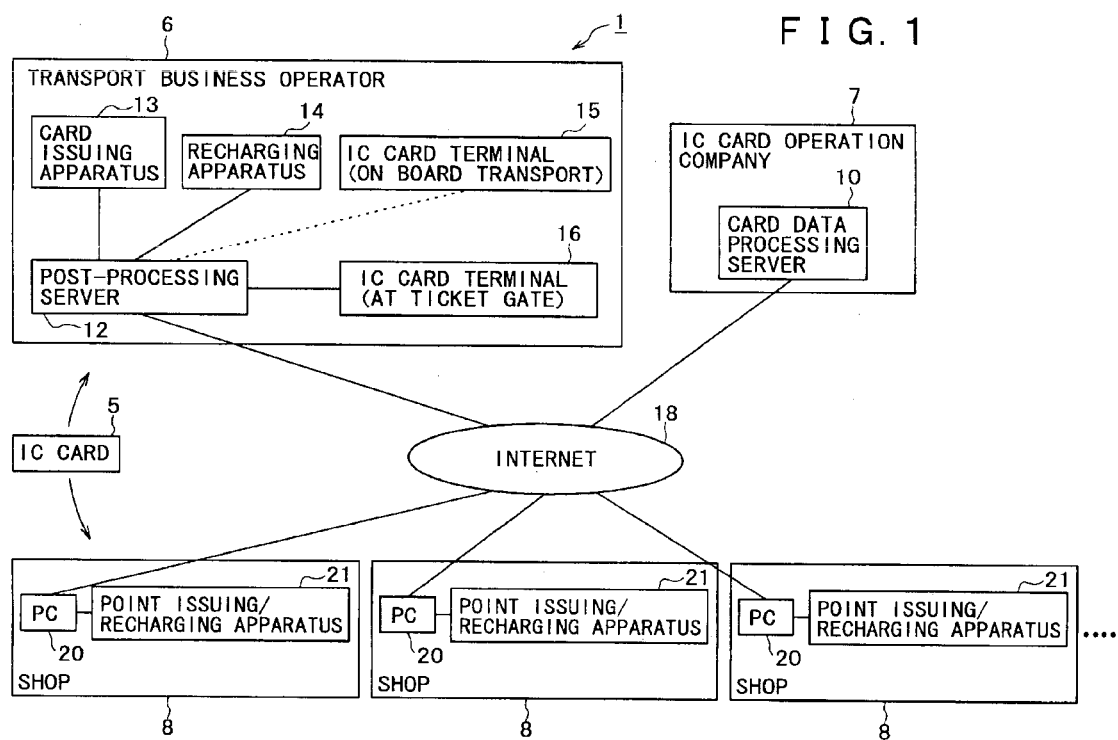
FIG. 1 is a block diagram showing a system configuration of an IC card operation system according to the invention.

This invention is preferably embodied in such a manner as to facilitate the introduction of an IC card system by obtaining the collaboration of municipalities and local businesses such as blocks of shops.

The IC card embodying the invention has two storage areas, i.e., a public and a private area. The public area stores transport fare discount points issued as reward points by local shops and/or municipalities (simply called the shop or shops hereunder). The private area accommodates a prepaid transport fare value for using transport such as the bus or train.

The public area identifies each of the shops involved and retains the number of transport fare discount points issued by each shop.

Possessing a single IC card thus allows the card holder both to manage the transport fare discount points issued by a plurality of shops and to adjust the fare upon using transport.

The user may expend the transport fare discount points issued by shops to pay the transport fare. After the user has exhausted the transport fare discount points, the cumulative sum of transport fare discount points issued by each shop is still kept unchanged on the IC card.

This means that each shop accepting the IC card of a customer can check the sum total of transport fare discount points issued by the shop in question to see how important the customer is for this shop, i.e., how much the IC card user has so far spent at this establishment.

If shops are commissioned by a transport business operator to recharge transport fare values on IC cards, customers may have their IC cards recharged at any shop they drop by. In exchange for doing the recharging, the shops are entitled to receive predetermined fees from the transport business.

The private area on the IC card also accommodates a card ID for identifying the card in question and ride history data detailing the card user's past uses of transport.

An IC card operation company operating the IC cards may gather the card users' ride history data through the transport business operator for analysis and data mining purposes. The IC card operation company may further collect data such as transport fare discount points issued by the shops for analysis and data mining.

A reward point system prevalent in blocks of local shops may be taken advantage of in setting up a scheme whereby the reward points issued by shops are converted into transport fare values illustratively for riding the bus. When fare value recharging apparatuses are set up where appropriate in the blocks of local shops, customers are invited to recharge their transport fare values on their IC cards using the recharging apparatus. The shops may receive predetermined fees in exchange for the fare values recharged at the locally installed recharging apparatuses. In this manner, the scheme facilitates introduction of an IC card system into local communities while promoting local commerce and business activities.

[Details of the Embodiments]

Preferred embodiments of this invention will now be described in detail with reference to FIGS. 1 through 9.

In an IC card operation system embodying the invention, participating shops perform two things on the card: issuing transport fare discount points, and recharging transport fare values under commission from a transport business operator.

FIG. 1 is a block diagram showing a system configuration of the IC card operation system according to the invention. As illustrated, the IC card operation system roughly comprises IC cards 5, a transport business operator 6, an IC card operation company 7, and shops 8, 8, 8, . . . .

The IC card 5 incorporates an IC chip and an antenna. There are terminals for writing and reading data to and from the IC card 5, each terminal having a suitably positioned antenna that emits weak radio waves. Holding up the IC card 5 to the antenna position causes the radio waves from the terminal to generate an induced electromotive force on the antenna of the IC card 5. The induced electromotive force drives the IC chip for data read and write operations. The IC chip has a storage medium that is divided into a plurality of areas for use in different applications. For this embodiment of the invention, the storage medium is divided into two portions called a private area and a public area.

The IC card is structured approximately as follows: in general, the IC card has its storage area divided into multiple regions for use in different applications. For this embodiment, as mentioned above, the storage area is divided into the private and public areas. The private area is used by an IC card issuer for card management purposes, while the public area is utilized by business operators for their specific usages.

More specifically, the public area has different memory regions appropriated for different businesses for their specific purposes in the form of proprietary files.

The private area accommodates such things as information for allowing the IC card issuer to manage these files, key information specific to the IC card issuer for use in encryption and decryption, and information used by the issuer for other purposes.

Each business operator gains access to its proprietary file on the IC card using an access key provided by the IC card issuer. The access key allows each business operator to access its proprietary file only; no file is accessible by anyone not in possession of the appropriate access key.

This card structure enables a single IC card to be utilized by a plurality of business operators for their particular uses with no interference therebetween.

With this embodiment of the invention, the private area on the IC card stores transport fare values and ride records, and the public area accommodates transport fare discount points issued by shops. As will be described later in more detail, each shop is assigned a unique issuer ID, so that the public area records the issued transport fare discount points in correspondence with each issuer ID. This makes it possible to know which shop has issued how many transport fare discount points.

The IC card 5 for use with this embodiment is a so-called prepaid card operating on the SF (stored fare) principle. Specifically, the storage medium of the IC card is charged with electronic money equivalent to a predetermined transport fare value. When using transport, the IC card holder adjusts the transport fare by utilizing the charged electronic money. Although the IC card 5 is assumed to function as a non-contact type IC card, this is not limitative of the invention. Alternatively, the IC card 5 may be a contact type IC card with its electrodes coming into contact with a terminal upon data read and write operations. As another alternative, the IC card 5 may be a hybrid type having both a non-contact and a contact type interface.

The transport business operator 6 is a business operator that runs transport such as buses and/or trains. The transport business operator 6 has a card issuing apparatus 13, a recharging apparatus 14, IC card terminals 15 and 16, and a back-end processing server 12.

The transporting means run by the transport business operator 6 is not limited to buses and trains. The operator 6 may run other means of transportation including streetcars, taxis, ships and planes.

The card issuing apparatus 13 is a machine that issues IC cards, commutation tickets, books of coupons, and other tickets. When a user enters a predetermined amount of money into the card issuing apparatus 13, the apparatus 13 issues an IC card carrying a corresponding transport fare value. Each issued IC card is assigned a unique card ID that distinguishes the card in question from other IC cards issued.

Although FIG. 1 shows only one card issuing apparatus 13, there may well be a plurality of issuing apparatuses each provided with a unique card issuing apparatus ID.

The card issuing apparatus 13 transmits such data as the card ID of each IC card issued, the transport fare value on each ID card, the date of card issuance, and the card issuing apparatus ID, either online or offline to the back-end processing server 12.

The recharging apparatus 14 is a terminal that recharges the IC card with a transport fare value. Generally, the recharging apparatus 14 comprises an IC card reader/writer, a cash register, and a control unit for controlling these components. When recharging a transport fare value on an IC card, a user inputs cash into the recharging apparatus 14 and holds up the IC card to a suitable position of the apparatus such as the reader/writer. For example, when the remaining transport fare value on the IC card has dropped to ¥500, the user of the card may recharge it with ¥4,500 using the recharging apparatus 14 to bring the balance to ¥5,000.

Although FIG. 1 shows only one recharging apparatus 14, this is not limitative of the invention. There may well be a plurality of recharging apparatuses each assigned a unique recharging apparatus ID.

The recharging apparatus 14 transmits such data as the card ID of each IC card recharged, the transport fare value recharged on each ID card, the date of recharging, and the recharging apparatus ID, either online or offline to the back-end processing server 12.

The IC card terminal 15 writes and reads data to and from the IC card 5. In operation, the terminal 15 adjusts the transport fare value and transport fare discount points (together with issuer IDs) on each IC card, and records or retrieves ride history data to or from the card.

The IC card terminal 15 comprises: a ROM (read only memory) that stores programs for adjusting transport fare values and transport fare discount points; a CPU (central processing unit) that performs predetermined processes using the programs in the ROM; a RAM (random access memory) used by the CPU as a working memory during processing; a storage medium drive for writing information to a removable storage medium; and an antenna for gaining access to the IC card 5. That is, the IC card terminal 15 of this embodiment has the capabilities of an IC card reader/writer.

The IC card terminal 15 is typically set up at the platform inside each bus. When getting on or off the bus, each passenger holds up his or her IC card 5 to the terminal 15. This prompts the programs in the ROM of the terminal to deduct a transport fare from the transport fare value and transport fare discount points. How transport fare discount points are converted to a transport fare value will be described later.

When the transport fare is paid through deduction from the transport fare discount points accumulated on the IC card 5, the IC card terminal 15 reads both the card ID of the IC card in question and the number of points expended.

The IC card terminal 15 and the back-end processing server 12 are connected offline. The data read by the IC card terminal 15 from an IC card 5 are written temporarily to a removable storage medium (e.g., a memory card) by the storage medium drive. And, at the end of the business hours, for example, the storage medium is removed from the IC card terminal 15 and loaded into the back-end processing server 12. In turn, the back-end processing server 12 retrieves from the loaded storage medium the data written thereto by the IC card terminal 15 during the day.

There may be a plurality of IC card terminals 15 each provided with a unique terminal ID. The terminal ID is also read from the memory card into the back-end processing server 12 so that the server 12 will recognize which IC card terminal 15 has collected the data being currently retrieved.

IC card terminals 16 may be set up illustratively at the ticket gates of train stations. Passengers holding up their IC cards 5 to the IC card terminals 16 can automatically have their fares adjusted upon using the trains.

The IC card terminal 16 is functionally identical to the IC card terminal 15. The difference is that the IC card terminal 16 transmits the data read from each IC card 5 to the back-end processing server 12 on an online basis.

There may be a plurality of IC card terminals 16 each assigned a unique terminal ID. This terminal ID, too, is read from the memory card for online transmission to the back-end processing server 12 so that the server 12 may recognize which IC card terminal 16 has collected the data being currently retrieved.

The back-end processing server 12 receives data (ride history data, points expended, etc.) from the card issuing apparatus 13, recharging apparatus 14, and IC card terminals 15 and 16. The received data are stored onto an appropriate storage medium such as a hard disc.

The back-end processing server 12 has a CPU, a ROM, a RAM and a mass storage medium such as a hard disc, as well as a communication control unit that connects the server 12 to a network. The mass storage medium contains an OS (operating system), a program for totaling received data, a program for generating ride history data based on collected data, a browser for browsing Web pages provided by a card data processing server 10 of the IC card operation company 7, and other programs.

The Web pages offered by the card data processing server 10 display totaled or analyzed data resulting from the data mining conducted by the IC card operation company 7.

The collected results and ride history data are transmitted by the back-end processing server 12 to the card data processing server 10.

When granting permission to a shop 8 to issue points, the transport business operator 6 assigns a unique issuer ID to that shop 8. The back-end processing server 12 has a shop database that manages the names, addresses, telephone numbers, and the assigned issuer IDs of the shops taking part in the scheme.

The issuer IDs held in the shop database are sent from the back-end processing server 12 to the card data processing server 10 over the Internet 18. Whenever a new issuer ID is assigned to a newly participating shop, that issuer ID is transmitted to the server 10.

The shops 8, 8, 8, . . . , comprise a liquor shop, a rice dealer, a fish shop, a meat shop, a supermarket, a convenience store, a coffee shop, and other local shops constituting blocks of shops that sell goods and wares, as well as service businesses including sports clubs, movie theaters and other establishments offering services. Municipal corporations such as hospitals and other public facilities may also be included. In the description that follows, the shops 8, 8, 8, . . . , may be simply referred to as the shop or shops 8 where no distinction is needed therebetween.

Each shop 8 is equipped with a personal computer (PC) 20 and a point issuing/recharging apparatus 21 (called the point issuing apparatus hereunder) connected to the PC 20. The PC 20 is installed in a manner connectable to the Internet 18 for data communication with the card data processing server 10.

The PC 20 comprises a CPU, a ROM, a RAM, a storage medium such as a hard disc, and a communication control unit.

The storage medium accommodates an OS for running the PC 20; application software such as a point issuing program, a Web browser, and a program for graphic representation of statistical data; and simple recharging software.

The point issuing program for control over the point issuing apparatus 21 is used to write points to the IC card 5.

This program is capable of calculating to the second decimal place the number of reward points corresponding to the amount for purchasing products or services. That is, so-called micro-points less than one point (e.g., 0.1 point) can also be handled.

The Web browser is used to browse dynamically surveyed data that the card data processing server 10 offers to each of the participating shops.

The program for graphic representation of statistical data is designed to present the shops with the dynamically surveyed data offered by the card data processing server 10, graphically or in an otherwise comprehensive manner.

Using the point issuing apparatus 21, each shop 8 can read from the IC card 5 the total number of points that it has issued so far.

When asked by a customer for recharging on his or her IC card 5, the simple recharging software causes the point issuing apparatus 21 to recharge the transport fare value on the card 5. In that sense, the point issuing apparatus 21 may function as a simplified recharging apparatus. The recharging of transport fare values is done on the point issuing apparatus 21 under commission from the transport business operator 6, as will be described later in more detail. This allows users to freely recharge transport fare values on their IC cards 5 whenever they drop by a shop; there is no need for them to go all the way to the offices of the transport business operator 6 for recharging.

The point issuing apparatus 21 is a machine that writes and reads data to and from the IC card 5, thereby rewriting transport fare discount points and transport fare values on the card. That means the point issuing apparatus 21 of this invention has at least the capabilities of an ordinary IC card reader/writer. Each shop either purchases or leases the point issuing apparatus 21 from the IC card operation company. Expensive if purchased, the point issuing apparatus 21 may be leased at low cost so as to reduce the burdens on the shops 8.

When transport fare discount points are issued onto an IC card, the PC 20 transmits to the card data processing server 10 the card ID of the IC card in question and the issued number of transport fare discount points together with the issuer ID. When a transport fare value is recharged on an IC card, the PC 20 sends to the card data processing server 10 the card ID of the card in question and the transport fare value data (i.e., amount of the recharged transport fare value) along with the issuer ID.

The PC 20 is billed by the card data processing server 10 for the transport fare discount points and the recharged transport fare values.

Because the points issued by the shops 8 are usable as the users' transport fares, the card data processing server 10 turns the issued points into the corresponding transport fares and bills the shops 8 for the fares. The shops 8 pay the transport business operator 6 the billed transport fare discount points-turned-fares and the recharged transport fare values.

Based on the information acquired from the transport business operator 6 and shops 8, the IC card operation company 7 manages transport fare discount points and transport fare values, extracts useful data from the acquired information in what is known as data mining, and provides such data to the transport business operator 6 and shops 8.

The IC card operation company 7 has the card data processing server 10 that is connectable to the back-end processing server 12 of the transport business operator 6 and to the PCs 20 of the shops 8 over the Internet 18.

The card data processing server 10 adjusts data on the number of transport fare discount points issued by each shop 8 and the transport fare values recharged also by each shop 8 in order to calculate the amounts billed to the shops 8. The calculated amounts are transmitted from the card data processing server 10 to the PCs 20 over the Internet 18.

The card data processing server 10 extracts useful data from the ride history data obtained from the back-end processing server 12 and from the transport fare discount point data acquired from the PCs 20 during so-called data mining, and provides the transport business operator 6 and shops 8 with such useful data. Also acting as a Web server, the card data processing server 10 offers the results of the data mining through its Web pages to the transport business operator 6 and shops 8.

The transport business operator 6 and shops 8 can each browse the Web pages using a suitable terminal connectable to the Internet 18. Browsing the pages involves first logging on to the card data processing server 10 by use of a user ID and a password unique to the transport business operator 6 and to each shop 8.

The specifics of data mining will be described later in more detail.

Figure 2:
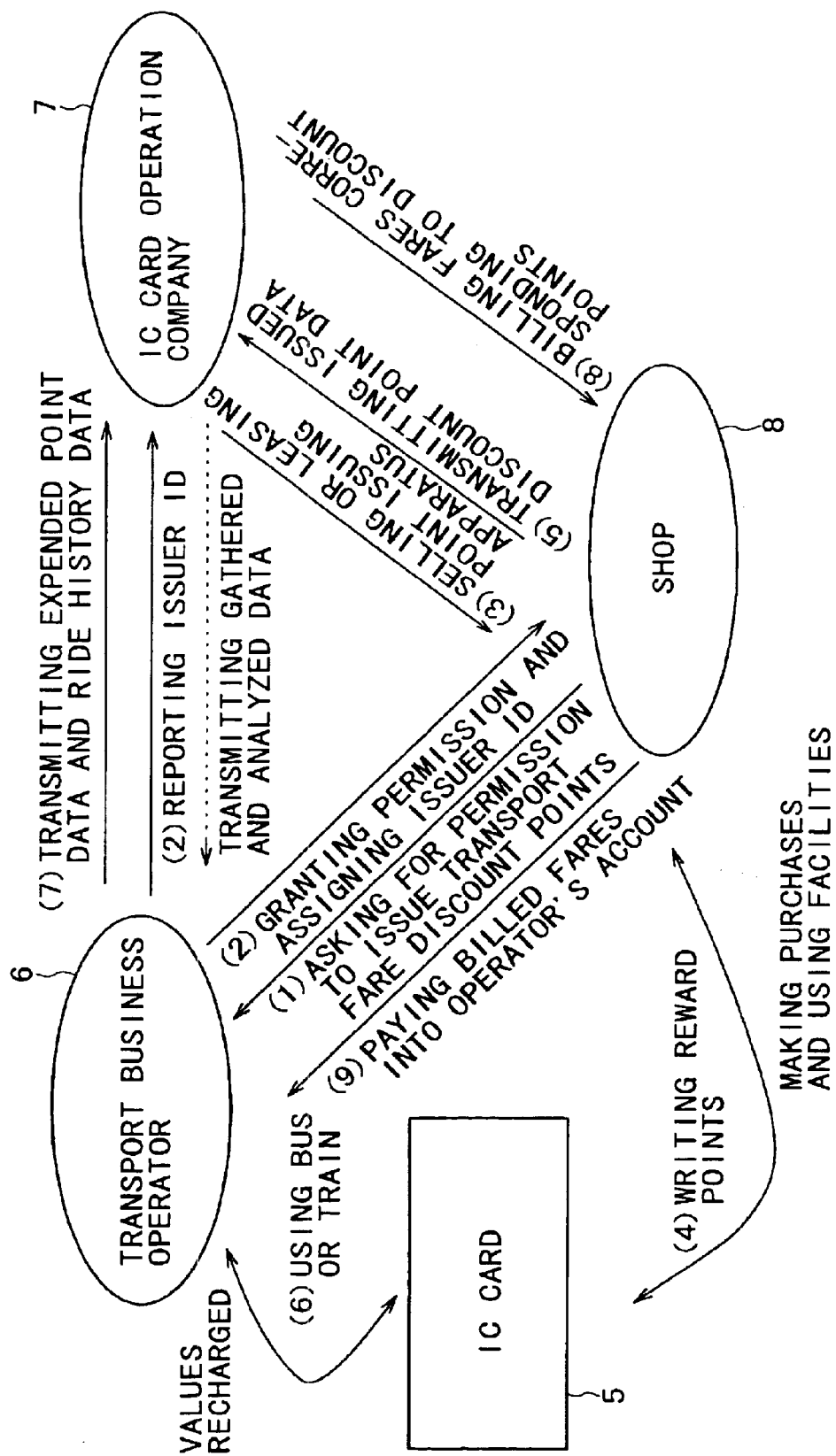
FIG. 2 is a schematic view illustrating how the IC card operation system is run, with shops issuing transport fare discount points.

FIG. 2 is a schematic view illustrating how the IC card operation system 1 is run, with the shops 8 issuing transport fare discount points. FIG. 2 summarizes the following steps:

(1) A shop 8 asks the transport business operator 6 for permission to issue transport fare discount points.

(2) The transport business operator 6 assigns an issuer ID to the shop 8 and informs simultaneously the IC card operation company 7 of information about the issuer ID.

(3) The shop 8 purchases or leases the point issuing apparatus 21 from the IC card operation company 7 under commission from the transport business operator 6.

(4) In proportion to the amount of purchase by each customer, the shop 8 writes transport fare discount points to his or her IC card 5 using the point issuing apparatus 21.

(5) The shop 8 periodically transmits the issued point data from the PC 20 to the IC card operation company 7 over the Internet 18.

(6) The user of the IC card 5 may use transport (bus, train, etc.) run by the transport business operator 6 by utilizing the transport fare discount points recharged on the IC card 5. At this point, the IC card terminal 15 or 16 converts the transport fare discount points on the ID card together with the issuer ID into a transport fare value.

(7) The transport fare discount points expended on the IC card terminal 15 or 16 are transmitted from the back-end processing server 12 to the card data processing server 10 over the Internet 18.

(8) At the end of the month, the IC card operation company 7 collects from the PC 20 of each shop the transport fare discount points issued during the month and converts the collected points into a transport fare that is billed to the shop 8 together with fees.

(9) The shop 8 pays into the account of the transport business operator 6 the amount of the fare billed by the IC cared operation company 7.

Where the IC card operation system 1 is run in the manner described above, customers can use the means of transportation run by the transport business operator 6 by exploiting the transport fare discount points on their IC cards issued upon purchase at the shops 8.

The IC card operation company 7 may compare the transport fare discount points expended on the transport with the total number of transport fare discount points issued by the shops 8, to see at what rate the issued transport fare discount points have been consumed.

As will be explained later, after the transport fare discount points accumulated from the shops 8 are expended as transport fares, the cumulative sum of points issued by each shop 8 is still retained. The shop-specific cumulative sums of points on the IC cards 5 allow the shops 8 to offer other discounts on the purchases of products or on the use of services at facilities.

Figure 3:
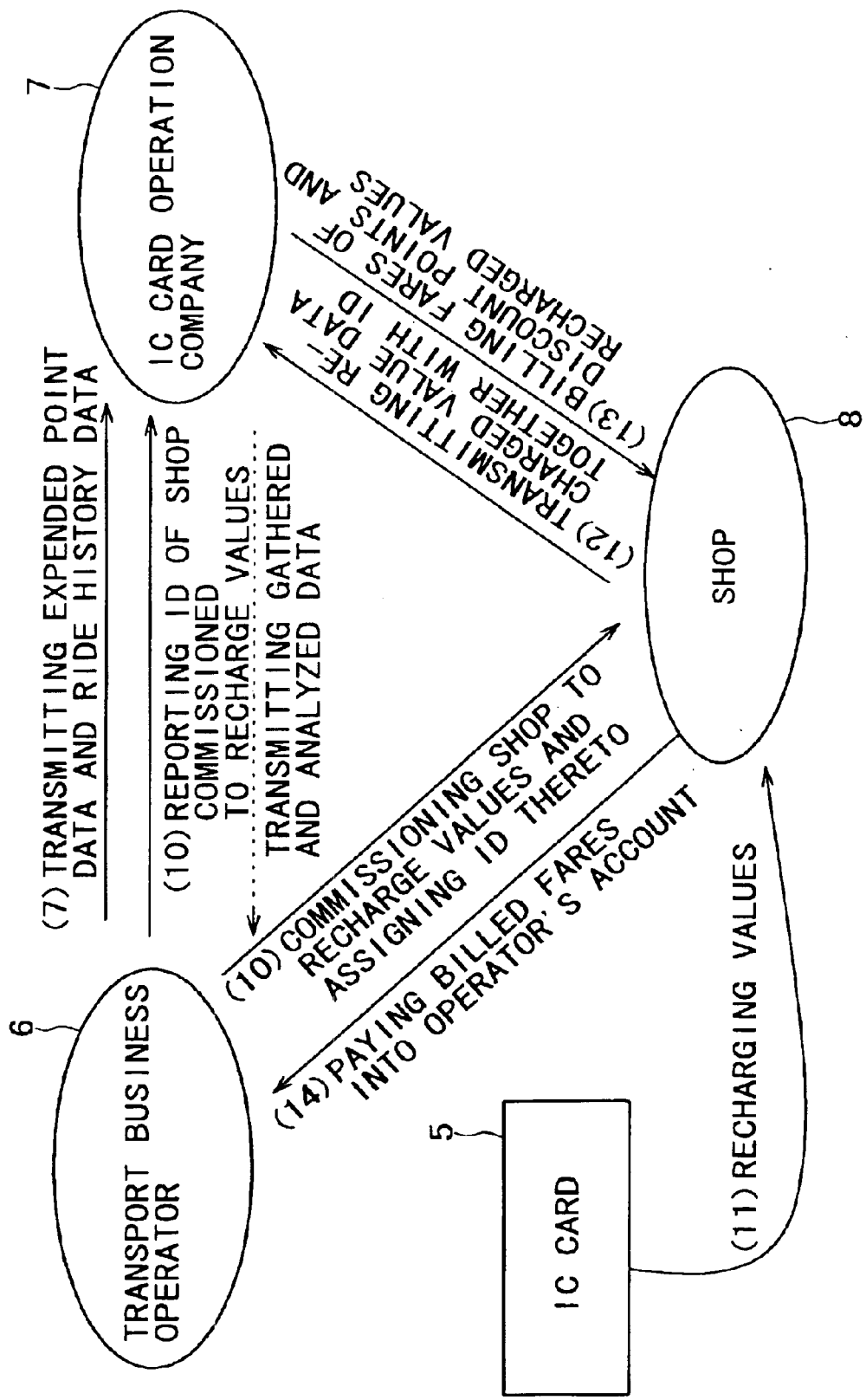
FIG. 3 is a schematic view depicting how the IC card operation system is run, with shops recharging transport fare values.

FIG. 3 is a schematic view depicting how the IC card operation system 1 is run, with the shops 8 recharging transport fare values. FIG. 3 summarizes the following steps:

(10) The transport business operator 6 commissions a shop 8 to recharge transport fare values and assigns an issuer ID to that shop 8. If the shop 8 has already been assigned an issuer ID for issuing transport fare discount points, this issuer ID is appropriated for the purpose. The transport business operator 6 informs the IC card operation company 7 of the issuer ID given to the shop 8.

(11) Upon request by a customer, the shop 8 using the point issuing apparatus 21 recharges a transport fare value together with the issuer ID on the customer's ID card 5. The recharging may be done singly as requested by the customer, or in the form of an additional transport fare value corresponding to the change that is not returned by request to the customer upon purchase at the shop 8.

(12) The shop 8 periodically transmits the recharged transport fare value together with the issuer ID from the PC 20 to the card data processing server 10 over the Internet 18.

(13) The IC card operation company 7 bills the shop 8 for the recharged transport fare value minus recharging fees. If the shop 8 is billed for the transport fare that was converted from the transport fare discount points in step (8) above, that amount is also included in the billing.

(14) The shop 8 pays into the account of the transport business operator 6 the amount of the fare billed by the IC card operation company 7.

When the shops 8 are commissioned to recharge transport fare values as described above, the transport business operator 6 can reduce the number of recharging apparatuses that must be set up solely at its own expense. The shops 8 gain recharging fees and can expect to improve their cash flows. The customers can recharge their transport fare values on their IC cards at local shops without taking the trouble to go to the offices of the transport business operator 6.

The IC card operation company 7 may utilize the ride history data obtained in step (7) above as dynamically surveyed data about transport users. Such data can be used for diverse purposes by different parties: by the transport business operator 6 as basic data for optimizing bus and train services; by the shops 8 as basic data for grasping the customers' spending propensities; and by municipalities as basic data for increasing the transparency in furnishing the transport business operator 6 with welfare subsidies appropriated for the elderly and other specific groups of people.

Figure 4:
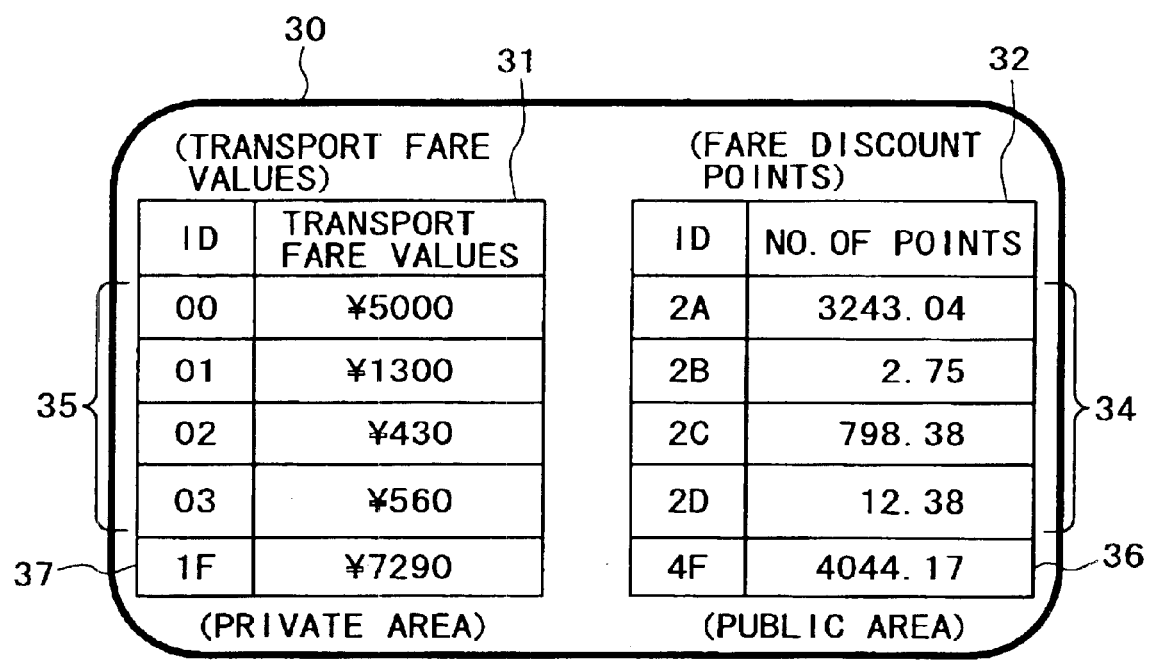
FIG. 4 is a schematic view indicating a storage area structure on an IC card of the invention.

FIG. 4 is a schematic view indicating a typical structure of a storage area 30 on the IC card 5 of this invention. The storage area 30 is bisected into a private area 31 and a public area 32, the private area 31 retaining a transport fare value, the public area 32 accommodating transport fare discount points.

The private area 31 is made up of two areas: a transport fare value area 35 for storing transport fare values on an issuer-by-issuer basis, and a transport fare value sum area 37 for retaining the sum of transport fare values. The transport fare value area 35 accommodates transport fare values together with issuer IDs. This embodiment has the issuer ID of the transport business operator 6 set to 00, the issuer IDs of the shops 8 to 01 through 03, and the ID of the transport fare value sum area 37 to 1F. However, this is not limitative of the invention; there are no constraints on specific values, number of digits, etc., about the IDs to be used. The transport fare value area 35 serves as a payable amount area accommodating an amount that is payable as transport fares.

The issuer IDs of shops 8 are limited to 01 through 03 in the area 35 of this embodiment only for purpose of simplification and illustration. In practice, the area 35 retains the issuer IDs of all shops 8 at which the IC card 5 in question has been recharged with transport fare values.

If an IC card 5 is to be recharged with a transport fare value for the first time at a given shop 8, the ID of that shop 8 has not been recorded yet in the private area 31 of the IC card 5 in question. In such a case, the point issuing apparatus 21 of the shop 8 generates within the private area 31 a new region where the transport fare value is to be recorded in correspondence with the ID of the shop 8 in question.

The public area 32 is constituted by two areas: a transport fare discount point area 34 for storing transport fare discount points on an issuer-by-issuer basis, and a point sum area 36 that retains a cumulative sum of points. The transport fare discount points are recorded together with the corresponding issuer IDs in the transport fare discount point area 34. Although this embodiment has the IDs of the shops 8 set to 2A through 2D and the ID of the point sum area 36 to 4F, this is not limitative of the invention; there are no constraints on specific values, number of digits, etc., about the IDs to be used. So-called micro-points down to the second decimal place may be accumulated in the point sum area 36.

The transport fare discount point area 34 constitutes an issuer-specific point area that accommodates the cumulative sum of points issued by each shop 8 (i.e., point issuer) on a shop-by-shop basis. The point sum area 36 serves as a common point area that accumulates the issued points regardless of the identities of the shops 8.

The IDs of the shops 8 are limited to 2A through 2D in the area 34 of this embodiment only for purpose of simplification and illustration. In practice, the area 34 retains the IDs of all shops 8 at which the IC card 5 in question has been issued with points.

If an IC card 5 is to be issued with points for the first time at a given shop 8, the ID of that shop 8 has not been recorded yet in the public area 32 of the IC card 5 in question. In that case, the point issuing apparatus 21 of the shop 8 generates within the public area 32 a new region where transport fare discount points are to be recorded in correspondence with the ID of the shop 8 in question.

Described below with reference to FIGS. 5 through 8 is how transport fare discount points are written to the IC card 5, along with related topics.

FIG. 5 is a schematic view explaining how the point issuing apparatus 21 of the invention writes transport fare discount points to the IC card 5.

It is assumed that the shop 8 with the issuer ID of 2A counts as one point one percent of the amount of purchases made by any customer.

If a customer has made a purchase worth ¥2,000, then the point issuing apparatus 21 adds 20 points, i.e., one percent of the purchase, cumulatively to a region identified as 2A in the transport fare discount point area while adding the same 20 points to the point sum area 36 simultaneously.

That is, the point issuing apparatus 21 adds points of a predetermined percent of purchases made at a shop to both the transport fare discount point area and the point sum area 36 on the IC card 5, and the transport fare discount point area accommodates the added points in a specific region identified by the ID of the shop in question.

FIG. 6 is a schematic view showing how a transport fare for a bus or a train run by the transport business operator 6 is adjusted using transport fare discount points retrieved from the IC card 5.

When a passenger boarding a bus or a train adjusts the transport fare using the IC card 5, the IC card terminal 15 or 16 deducts the points corresponding to the fare from the point sum area 36 of the public area 32. In such a case, the IC card terminal 15 or 16 never deducts points from the transport fare discount point area 34.

Illustratively, the points issued by each shop 8 may be converted to transport fares on a yen-per-point basis. The same point-to-yen conversion rate is applied to all participating shops 8.

When a passenger using transport is to adjust a fare of ¥100 using the IC card 5, the IC card terminal 15 or 16 deducts 100 points from the point sum area 36. Nothing is added to or subtracted from the transport fare discount points in the transport fare discount point area 34.

As described, transport fare discount points are expended only from the point sum area 36. The cumulative sum of transport fare discount points per shop 8 are kept unchanged on the IC card 5. The IC card 5 thus allows the accumulated transport fare discount points to be consumed while keeping intact the cumulative sum of transport fare discount points per shop 8.

Figure 7:
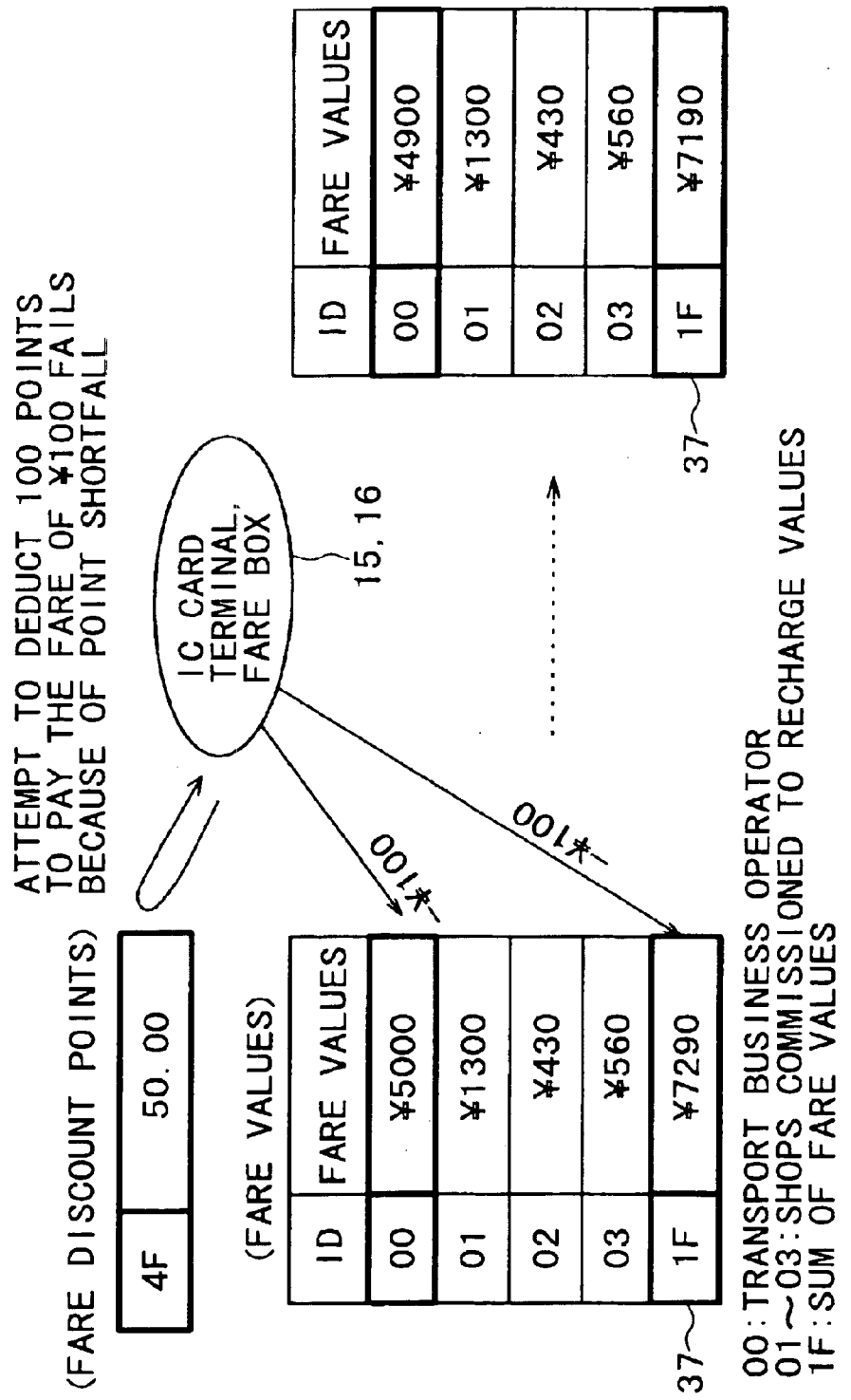
FIG. 7 is a schematic view illustrating how a transport fare is adjusted using the IC card where the number of points stored in a point sum area of the card falls short of the fare.

FIG. 7 is a schematic view illustrating how a transport fare is adjusted using the IC card 5 where the number of points stored in the point sum area 36 of the card falls short of the fare.

If an attempt to deduct the sum of transport fare discount points from the transport fare fails because of a point shortfall, then the IC card terminal 15 or 16 deducts the entire transport fare from the fare value held in the private area 31.

Specifically, the IC card terminal 15 or 16 deducts the transport fare from both the region identified as 00 (i.e., area in which the transport fare value is recharged by the transport business operator 6) and the region identified as 1F (i.e., area in which the sum of transport fare values is stored). If the transport fare value in the region 00 falls short of the fare, then the shortfall is deducted from the fare value held in the region 01.

If the transport fare value in the region 01 falls short of the fare, then the shortfall is deducted from the fare value contained in the region identified as 02. The deduction is repeated until the transport fare is paid in full.

Alternatively, where the sum of transport fare discount points is insufficient to pay the transport fare, all accumulated transport fare discount points may be expended first. Any shortfall that may result may then be deducted from the transport fare value accumulated in the private area 31.

Figure 8:
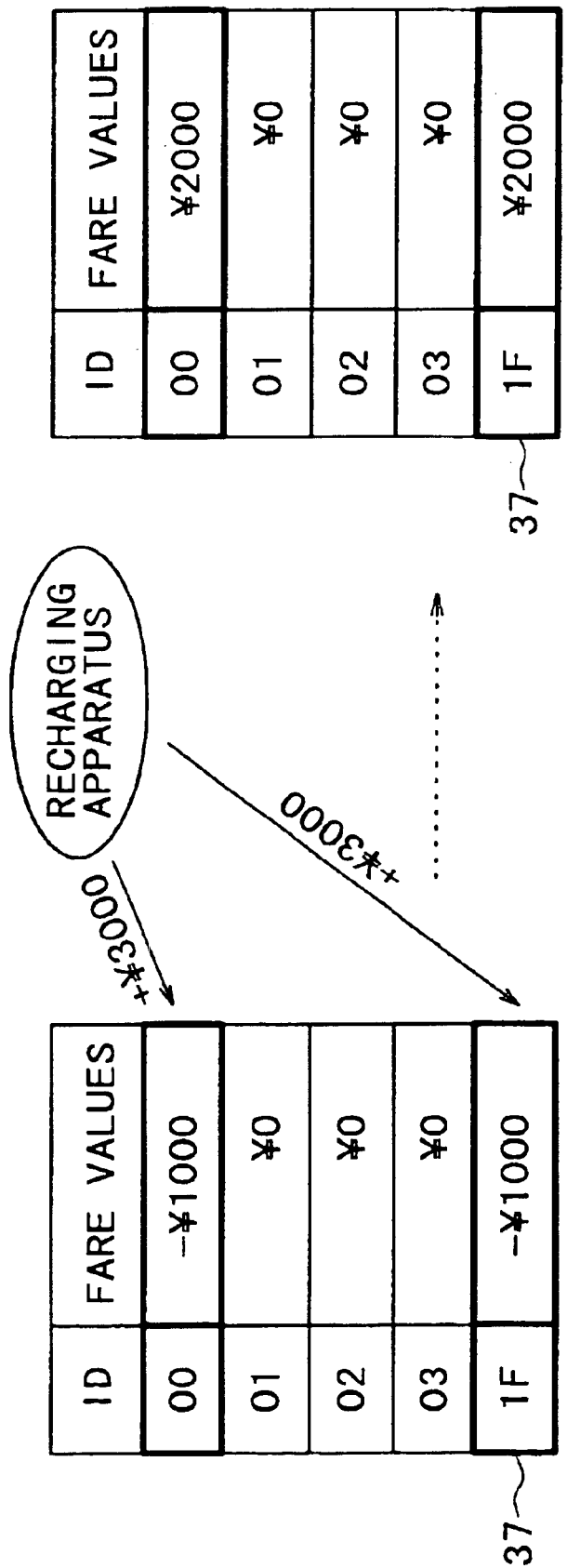
FIG. 8 is a schematic view depicting how a transport fare is adjusted using the IC card where the sum total of transport fare discount points and transport fare values stored on the card falls short of the fare.

FIG. 8 is a schematic view depicting how a transport fare is adjusted using the IC card 5 where the sum total of transport fare discount points and transport fare values stored on the card 5 falls short of the fare.

If an attempt to deduct the sum of transport fare discount points and transport fare values from the fare fails because of a point shortfall, then the IC card terminal 15 writes that shortfall as a negative value to the regions identified as 00 and 1F provided a predetermined ceiling is not exceeded. At the next recharging, the transport fare value is replenished so as to cover the negative value.

Suppose that an attempt by a passenger to adjust the transport fare by use of his or her IC card 5 fails because the retained value on the card falls short of the actual fare by ¥1,000.

In that case, the IC card terminal 15 or 16 writes a deficit of ¥1,000 to the regions identified as 00 and 1F. When the passenger later recharges the transport fare value by ¥3,000 on the recharging apparatus 14, the actual transport fare value written to the regions 00 and 1F is ¥2,000 each.

Alternatively, a deposit may be set aside in advance. Any deficiency may be deducted from that deposit instead of having a minus value written to the IC card 5.

In this case, the user of an IC card 5 purchases the card that covers the deposit as well. Any amount short of the transport fare is deducted from the deposit. The deductions are replenished when the transport fare value is later recharged. The deposit will be returned to the user when the IC card is eventually surrendered.

Figure 9:
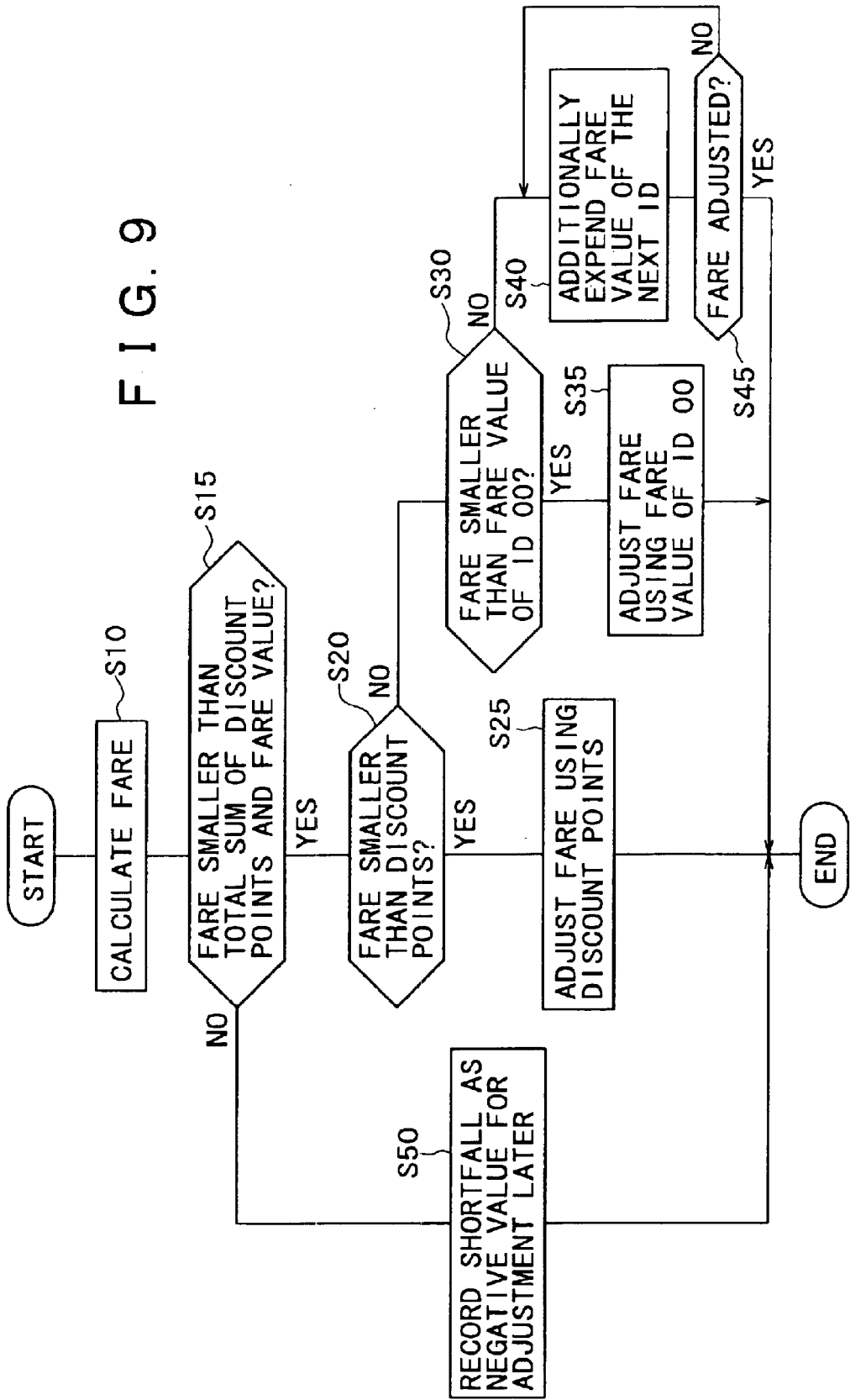
FIG. 9 is a flowchart of steps in which an IC card terminal adjusts a transport fare using the IC card.

FIG. 9 is a flowchart of steps in which the IC card terminal 15 adjusts a transport fare using the IC card 5. The IC terminal 16 operates in the same manner as the IC terminal 15.

When a passenger adjusts the fare of a bus or a train using the IC card 5, the IC card terminal 15 reads from the card 5 data designating the section the passenger has traveled and calculates the fare corresponding to that section (in step S10).

The IC card terminal 15 then gain access to the storage area 30 of the IC card 5, acquires the total transport fare value from the transport fare value sum area 37, and obtains the sum of transport fare discount points from the point sum area 36. The IC card terminal 15 converts the sum of transport fare discount points to a transport fare value at a predetermined rate, and adds the converted value to the previously acquired fare value so as to find the total transport fare value retained on the IC card 5.

The IC card terminal 15 then compares the total value with the transport fare (in step S15).

If the total transport fare value is judged to be smaller than the transport fare ("No" in step S15), then the IC card terminal 15 expends the total value on the transport fare and records the shortfall as a negative value to the regions identified as 00 and 1F (in step S50).

If the total transport fare value is judged to be larger than the transport fare ("Yes" in step S15), then the IC card terminal 15 judges (in step S20) whether the fare is smaller than an amount converted from the sum of transport fare discount points held in the area identified as 4F (in the point sum area 36).

If the amount converted from the sum of transport fare discount points is judged to be larger than the transport fare ("Yes" in step S20), then the IC card terminal 15 deducts the points equivalent to the fare from the region 4F for adjustment (in step S25).

If the amount converted from the sum of transport fare discount points is judged to be smaller than the transport fare ("No" in step S20), then the IC card terminal 15 determines whether the actual transport fare is smaller than the fare value held in the region 00 (in step S30).

If the transport fare value retained in the region 00 is judged to be larger than the transport fare ("Yes" in step S30), the IC card terminal 15 deducts the transport fare value equivalent to the actual fare from the regions 00 and 1F each (in step S35).

If the transport fare value stored in the region 00 is judged to be smaller than the actual transport fare, the IC card terminal 15 expends first the fare value held in the region 00 on the transport fare and then the fare value retained in the region 01 to make up for the shortfall (step S40).

The IC card 15 then determines whether the whole transport fare has been adjusted using the transport fare value (in step S45). If there is a deficit ("No" in step S45), the IC card terminal 15 attempts to compensate for it using a transport fare value held in a region identified by the next ID number. Steps S40 and S45 are repeated until the fare is adjusted.

When the fare has been adjusted and paid for ("Yes" in step S45), the IC card terminal 15 substitutes the adjusted transport fare value for the current value in the transport fare value area 35, and deducts the fare from the transport fare value retained in the region identified as 1F (in the transport fare value sum area 37).

Described below is how data mining is carried out using ride history data. First, ride history data are gathered as follows:

The private area 31 on the IC card 5 accommodates not only transport fare values but also other data such as ride history data.

The ride history data may illustratively include a card ID, a special card ID (for the aged, for the disabled, for small children, etc.), the IDs of the stops or stations at which the passenger using the IC card 5 got on board, the times of day at which the passenger got on board, the IDs of the stops or stations at which the passenger got off, the times of day at which the passenger got off, and so on.

Such data are retrieved by the IC card terminals 15 and 16. The retrieved data are transmitted from the back-end processing server 12 to the card data processing server 10 over the Internet 18.

The IC card operation company 7 adds up and analyzes the ride history data thus collected so as to carry out dynamic surveys.

Specifically, dynamic surveys involve statistically processing data about how many and what category of passengers started using the transport from which stops or stations and got off the transport at which stops or stations.

Parameters of the statistical processing may typically include periods of time surveyed, times of day and days of the week at which the passengers used the transport, stops or stations at which the passengers got on board the transport and got off, the number of passengers involved, average travel times (distances), number of passengers with special IC cards (e.g., welfare pass cards for the elderly), and card IDs. It should be noted that the card IDs are surveyed only with explicit permission granted by the passengers.

The results of the dynamic surveys may be utilized by the transport business operator 6, local shops, and municipalities as follows:

By grasping the flow and ebb of passengers on different days of the week and in different time zones of the day along different sections of travel, the transport business operator can optimize management of its transport services. This in turn is expected to improve convenience for the passengers and enhance efficiency in transport operation. Knowing the locations, time zones, and days of the week in and on which the passengers tend to concentrate serves the transport business operator 6 as an important basis for dynamically working out its marketing strategy (e.g., for setting up new shops, for residential development).

The local shops can optimize their inventories of perishable products (perishable foods, unbaked sweets, packed lunches, etc.) upon recognizing the locations, time zones, and days of the week in and on which the passengers are supposed to concentrate. Better optimization can be expected if the surveyed results are combined with weather forecast data.

Knowing the exact locations where people concentrate affords some shops a viable rule of thumb by which to select suitable sites for establishing their branches.

For real estate agents involved especially in the apartment-rental market and residential development, the dynamic surveys above provide exact travel times from specific properties to specific destinations. The data are valuable in presenting prospective customers with promising properties for rent or for pursuing successful residential development in particular localities.

Thanks to the dynamic surveys, municipalities are able to determine what has actually come out of the municipal subsidies for the elderly and the disabled to use public transport. The surveys provide basic data for allowing the authorities to budget the subsidies for the next fiscal year.

The dynamic surveys above offer exact, up-to-date information on people's movements at low cost, i.e., without conducting labor-intensive traffic flow surveys. The data can be referenced by the municipalities in working out traffic-related policies.

The data may be further utilized as a basis for deciding on sites at which to build public facilities in the future.

What follows is a description of how the so-called data mining is carried out based on transport fare discount points. The data on the issued transport fare discount points are sent from the PCs 20 of the shops 8 (local shops as well as municipalities) to the card data processing server 10 over the Internet 18.

The discount points issued by the local shops and municipalities (i.e., by public facilities) may be analyzed in user-specific fashion and translated into what is known as a loyalty program (for gaining more repeaters for purchasing goods or services). From a privacy protection point of view, permission to utilize user IDs, card IDs and other information identifying those holding the cards must be obtained in advance from the IC card holders.

Parameters used in these analyses may typically include the times of day, days of the week, months, and years at and in which the points were issued; point issuer IDs; and card IDs.

The analyzed data about the individual shops and public facilities may be employed in the manner described below.

It should be noted that the data are handled as personal data and will not be disclosed to any third party.

From the viewpoint of each shop, the larger the number of transport fare discount points that a customer accumulated over a given period or the larger the number of times the customer was issued with discount points, the more important that customer is for the shop in question. These customers may be offered such incentives as preferential invitations to events, fairs, etc., and greater discounts on subsequent purchases, whereby the favored customers may be retained for continued patronage.

From the viewpoint of a public facility, the higher the frequency with which a user was issued with transport fare discount points over a given period, the more likely the user will become a repeater for using the facility in question. These users may be offered incentives such as preferential invitations to events and greater discounts on the facility use fees, whereby the favored users may be retained for repeated usage of the facility.

The inventive IC card operation system 1 discussed above provides the following major advantages:

(1) Advantages for the Users of IC Cards 5

When using the IC cards 5, customers making purchases at the shops 8 get discounts on the fares of the transport run by the transport business operator 6. The customers dropping by the shops 8 can recharge transport fare values at nearby locations without taking the trouble to go to the offices of the transport business operator 6. In proportion to the number of reward points accumulated on their cards, the customers can also get discounts on their purchases at the shops 8.

The IC card holders get on and off the transport smoothly so that crowdedness on board as well as traffic congestion as a whole can be eased.

Furthermore, using the IC cards allows the elderly to adjust their fares in barrier-free fashion.

The IC cards also afford their holders smooth transfers between buses and trains or between other means of transportation.

(2) Advantages for the Transport Business Operator

Widespread use of the IC cards enhances convenience for passengers and contributes to boosting ridership. On the bus, the driver is spared the chores of collecting fares in small change from the passengers.

The IC card 5 costs less than magnetic cards to maintain. Dynamic surveys conducted by means of the IC cards help the transport business operator to optimize transport service management. By cooperating with the local shops and/or municipalities in running the IC card system, the transport business operator can expect to gain more people using the transport.

The cooperation helps reduce the cost of setting up the back-end processing system, which translates into more discounts on transport fares.

In keeping with the number of transport fare discount points issued by the shops, the transport business operator receives compensation from the shops regardless of whether the discount points have actually been converted to fare values. This means that the fares are paid before the IC card holders use the transport, which improves the business operator's cash flows.

Since the IC card 5 has its storage area divided into a plurality of portions for use with multiple applications, the card system can be readily expanded for future applications.

(3) Advantages for the Local Shops and Municipalities

Offering reward points to customers allows the local shops to gain more customers. The shops can also obtain dynamically surveyed data on their customers thanks to the IC card system.

With the IC card system in place, municipalities can expect to see a smaller number of privately owned cars clogging the roads, so that traffic congestion is relieved and environmental protection promoted.

Issuing reward points helps increase the number of public facility users. The dynamically surveyed data allow the authorities to work out more effective traffic-related policies and to budget traffic-related subsidies in a more transparent, credible manner.

(4) Advantages for the IC Card Operation Company 7

Offering the IC card operation service brings fees and related revenues to the IC card operation company 7. Its data mining business allows the company 7 to offer the dynamically surveyed data profitably to its clients.

That is, with the card data processing server 10 run as a Web server through which the dynamically surveyed data are provided to the clients, the IC card operation company 7 can operate as an ASP (application service provider).

Furthermore, the company 7 can sell or lease the point issuing apparatuses 21 profitably to the participating local shops and municipalities.

With this embodiment of the invention, reward points issued by each shop 8 are recorded to the IC card 5. These points are converted to discounts that apply commonly to transport fares without interfering in the customer loyalty program of each shop 8, i.e., the original purpose of the reward point system.

Although this embodiment was shown allowing transport fare values to be recharged on the IC card 5 for using the transport run by the transport business operator 6, this is not limitative of the invention. Alternatively, the recharged values may be used for any other purpose.

For example, the recharged values may be expended on movie theater admission fees, telephone charges (of public telephones), gift certificates of a specific department store, and dinner coupons of a particular restaurant chain.

With this embodiment, the shops 8 issue the same number of points to be written to both the transport fare discount point area 34 and the point sum area 36. Alternatively, each shop may issue different numbers of points to be recorded to the areas 34 and 36.

Although this embodiment was shown having the local shops issue transport fare discount points as reward points, this is not limitative of the invention. Alternatively, the reward points may be converted to something other than the transport fare values. In other words, any other known discount points may be converted to transport fare values. There are no constraints on the uses of issued reward points.

(Variation of the Invention)

A variation of this invention involves adding a telephone business operator to the IC card operation system 1. In the description that follows, like reference numerals used in the above-described embodiment designate like or corresponding entities of this variation.

FIG. 10 is a schematic view showing an alternative structure of a storage area 50 on the IC card of the invention.

A private area within the storage area 50 is bisected into a transport fare value area 51 for accommodating transport fare values and a telephone charge value area 52 for retaining telephone charge values.

The transport fare value area 51 is structurally and functionally identical to the private area 31 shown in FIG. 4.

The telephone charge value area 52 contains telephone charge values that are recharged for use on IC card-compatible public telephones. A region identified as 11 in the area 52 stores a telephone charge value recharged by the telephone business operator. Regions identified as 01 through 03 each accommodate a telephone charge value that the IC card operation company 7 assigns to each shop 8 under commission from the telephone business operator. In FIG. 10, the shops 8 commissioned to recharge transport fare values are the same as those commission to recharge telephone charge values (i.e., shops with IDs 01 through 03). Alternatively, the shops dealing with transport fare values may be different from those handling telephone charge values.

A region identified as 1E in the area 52 stores the sum of telephone charge values.

A transport fare discount point area 53 accommodates cumulative sums of transport fare discount points issued by the shops 8, in conjunction with their IDs. A region identified as 4E in the area 53 holds the sum of discount points that are converted to a telephone charge value when expended; a region identified as 4F in the area 53 retains the sum of discount points that are converted to a transport fare value when consumed.

When a shop 8 issues discount points using its point issuing apparatus 21, these points are added to the number of discount points in the region identified by the ID of that shop. At the same time, the region 4E is replenished by 10 percent of the number of issued points (for use as a telephone charge value), and the region 4F is given 90 percent of the number of issued points (for use as a transport fare value). The above ratio of apportioning discount points between the areas 4E and 4F is a default setting which may be altered as requested by the IC card holder upon issuance of discount points.

The discount points accumulated in the region 4F are converted to transport fare values in the same manner as with the above-described embodiment.

The discount points accumulated in the region 4E are converted to a telephone charge value in the same manner as in conversion to transport fare values. That is, when the IC card holder places a call using the IC card on an IC card-compatible public telephone, the public telephone converts the discount points held in the region 4E to a telephone charge value at a predetermined rate before expending the converted value. In this case, the public telephone updates only the number of discount points held in the region 4E and leaves intact the number of discount points accumulated by each of the shops 8 involved.

When the discount points held in the region 4E have been exhausted (i.e., reduced to zero), the public telephone adjusts the telephone charges by successively expending values first from the region 11 and then from the region 01, and so on.

As described, this variation of the invention involves dividing the above-mentioned storage area 30 of the IC card 5 in such a manner that the discount points issued by the shops 8 may be used both as transport fare values and as telephone charge values.

Although this variation of the invention was shown having the IC card 5 carry both transport fare values and telephone charge values, this is not limitative of the invention. Alternatively, other kinds of values may be retained on the IC card 5.

As another alternative, the storage area 30 of the IC card 5 may be divided into more than two areas so as to accommodate more than two kinds of values.

Implementing this invention provides an IC card, an IC card operation system, a point issuing apparatus, an adjusting apparatus, a center apparatus, and a billing apparatus whereby data held on the IC card are enhanced in value so as to promote widespread use of an IC card scheme.

What is claimed is:

1. An IC card comprising:
    an issuer-specific point area for storing cumulative amounts of points issued by point issuers, the issued points being accumulated in a manner specifying each of said cumulative points for the corresponding point issuer;
    a common point area for storing a cumulative amount of said points issued by said point issuers, the issued points being accumulated in a manner mingling all point issuers; and
    a payable amount area for storing a payable amount that may be paid so as to acquire either a product or a service offered by a specific business operator,
    wherein a default ratio of apportioning said points issued by point issuers exists between said issuer-specific point area and said common point area, and
    wherein said default ratio may be altered by an IC card holder.

2. An IC card operation system utilizing an IC card according to claim 1, the system comprising:
    a point issuing apparatus for issuing points to be stored into at least one of said issuer-specific point area and said common point area;
    an adjusting apparatus for allowing said business operator to adjust an amount to be paid using at least either said points accumulated in said common point area or said payable amount stored in said payable amount area, wherein said cumulative amount of said points in said common point area is convertible into said payable amount at a predetermined rate; and
    a center apparatus for acquiring the number of points issued by said point issuing apparatus for storage into said common point area, said center apparatus further calculating the amount of points to be adjusted by said point issuers in payment for said business operator by use of the acquired number of issued points.

3. An IC card operation system according to claim 2, wherein said point issuing apparatus further comprises a recharging function for recharging said payable amount in said payable amount area; and
    wherein said center apparatus acquires from said point issuing apparatus the payable amount recharged by said point issuing apparatus, said center apparatus further calculating the recharged payable amount adjusted to be paid by said point issuers to said business operator by use of the acquired payable amount.

4. An IC card operation system according to claim 3, wherein, upon calculating the recharged payable amount adjusted to be paid by said point issuers to said business operator, said center apparatus deducts fees to be provided to said point issuers from the amount recharged by said point issuers.

5. A point issuing apparatus for use by an IC card operation system according to claim 2, the apparatus comprising:
    point issuing means for issuing points to be stored into at least one of said issuer-specific point area and said common point area;
    issued point count providing means for providing said center apparatus with the number of points issued for storage into said common point area; and
    accumulated point presenting means for acquiring and presenting the cumulative amount of points issued by a specific point issuer upon retrieval from said issuer-specific point area.

6. A point issuing apparatus according to claim 5, further comprising:
    recharging means for recharging said payable amount in said payable amount area; and
    recharged amount providing means for providing said center apparatus with the recharged payable amount.

7. An adjusting apparatus for use by an IC card operation system according to claim 2, the apparatus comprising:
    payment amount acquiring means for acquiring an amount to be paid; and
    converting means for converting the points accumulated in said common point area into said payable amount at a predetermined rate;
    wherein said converting means acquires the points corresponding to the acquired amount to be paid and deducts the acquired points from said common point area; and
    wherein, if the payable amount acquired by said converting means falls short of the acquired amount to be paid, then the shortfall is deducted from said payable amount area in order to adjust said amount to be paid.

8. A center apparatus according to claim 2, further comprising presenting means for calculating a billed amount to be paid by said point issuers to said business operator by use of the number of points issued by said point issuing apparatus and the recharged payable amount, said presenting means further presenting the calculated billed amount to said point issuers.

9. A center apparatus according to claim 8, wherein fees to be provided to said point issuers upon addition of points by said point issuing apparatus are deducted from said billed amount calculated.

10. A center apparatus according to claim 8, wherein said adjusting apparatus further comprises history accessing means which, upon gaining access to a storage area of said IC card when said IC card is used for payment, either writes to or reads from said storage area a history of any products and services purchased from said business operator, and wherein said center apparatus further comprises data mining result providing means for providing said business operator with information resulting from data mining of said history acquired by said history accessing means.

11. An IC card operation program executed by a computer used by an IC card operation system utilizing an IC card according to claim 1, said IC card operation program causing said computer to carry out the steps of:

issuing points to be stored into at least one of said issuer-specific point area and said common point area in accordance with intentions of said point issuers;

allowing said business operator to adjust an amount to be paid using at least either said points accumulated in said common point area or said payable amount stored in said payable amount area, wherein said cumulative amount of said points in said common point area is convertible into said payable amount at a predetermined rate; and acquiring the number of points issued in said point issuing step for storage into said common point area, so as to calculate the amount of points to be adjusted by said point issuers in payment for said business operator by use of the acquired number of issued points.

12. An IC card operation program according to claim 11, wherein the point issuing step further causes said computer to carry out the step of recharging said payable amount in said payable amount area; and wherein the adjusted point amount calculating step further comprises acquiring the payable amount recharged in the point issuing step, so as to calculate the recharged payable amount adjusted to be paid by said point issuers to said business operator by use of the acquired payable amount.

13. An IC card operation program according to claim 12, further causing said computer to carry out the step of deducting fees to be provided to said point issuers from the amount recharged by said point issuers when, in the adjusted point amount calculating step, said computer calculates the recharged payable amount adjusted to be paid by said point issuers to said business operator.

14. An IC card according to claim 1, wherein at least one of said issuer-specific point area and said common point area is capable of storing micro-points each denoting a value less than one.

15. An IC card according to claim 1, wherein data are written to and read from said issuer-specific point area, said common point area, and said payable amount area in non-contact fashion.

16. A billing apparatus comprising:

recharged amount acquiring means for acquiring, from an IC card according to claim 1, an amount recharged by a recharging apparatus as an addition to a payable amount stored on said IC card, said payable amount being used to acquire either a product or a service, wherein a business operator having installed said recharging apparatus is billed for the recharged amount acquired minus fees to be provided to said business operator.

* * * * *